UNITED STATES PATENT OFFICE.

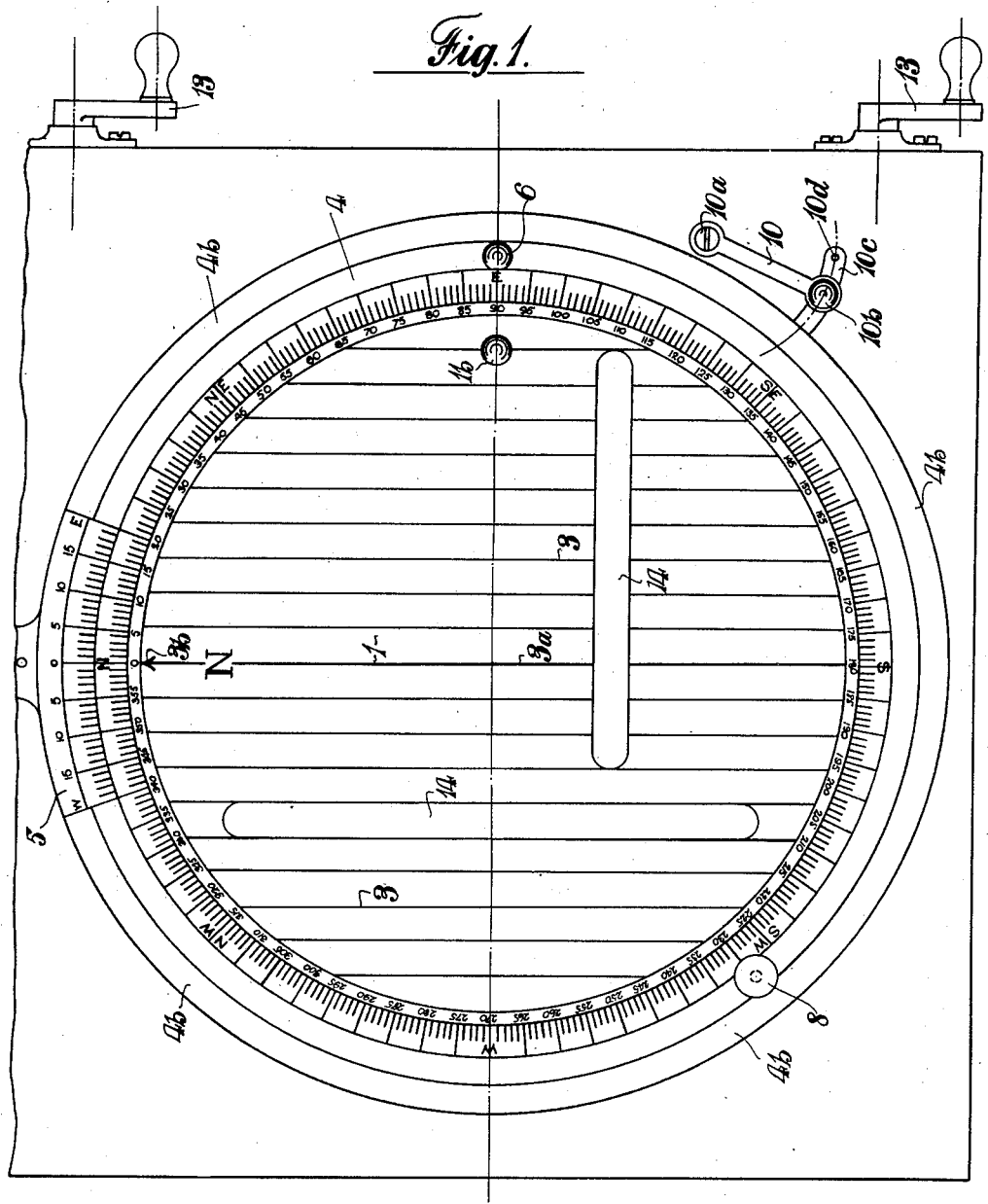

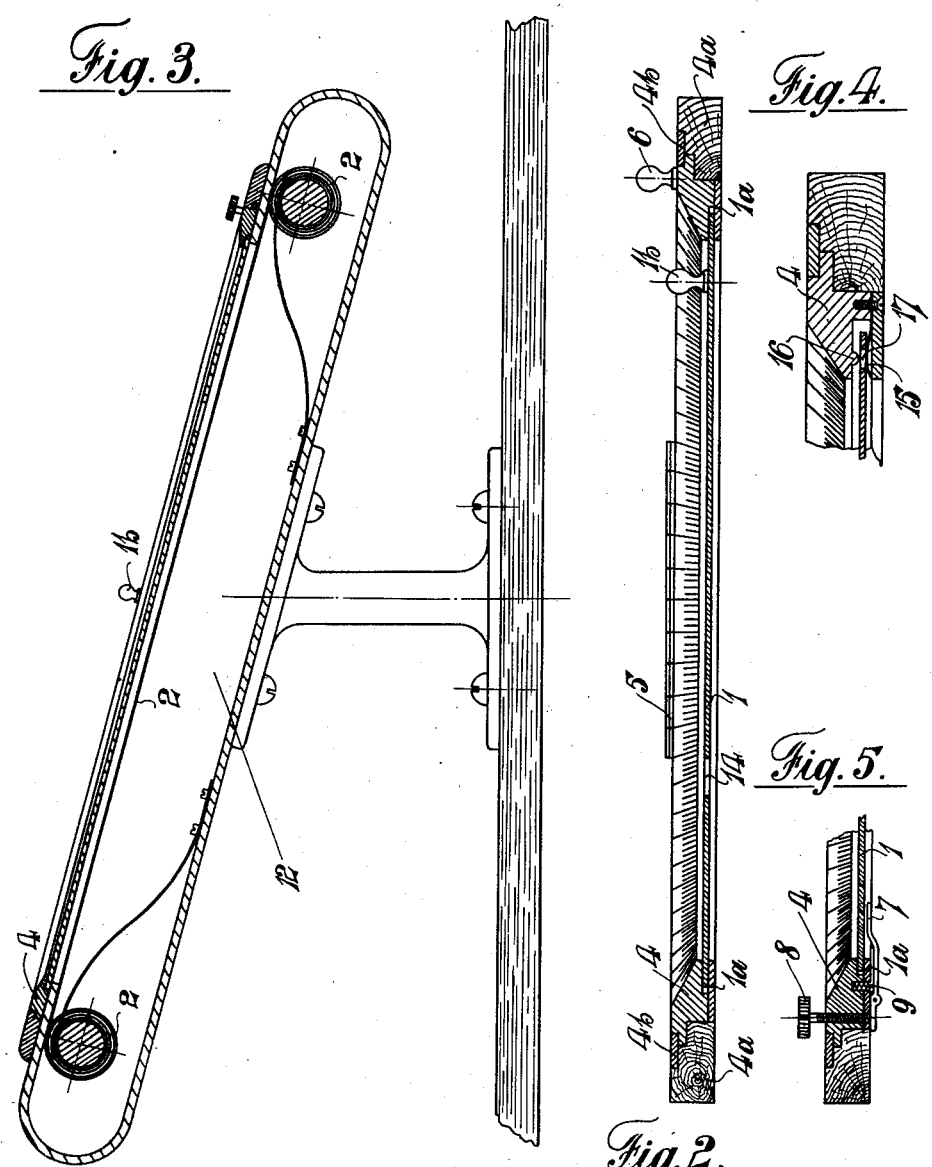

HENRY SAMUEL GIST, OF HENDON, LONDON, ENGLAND.

NAVIGATION DEVICE.

1,098,621. Specification of Letters Patent. Patented June 2, 1914.

Application filed November 12, 1913. Serial No. 800,490.

*To all whom it may concern:*

Be it known that I, HENRY SAMUEL GIST, residing at Hendon, London, England, have invented certain new and useful Improvements in Navigation Devices; and I do hereby declare the following to be a full, clear, and exact description of the invention, such as will enable others skilled in the art to which it appertains to make and use the same.

This invention relates to an improved navigation device, which, while designed and primarily intended for navigating aerial craft, is equally applicable for marine purposes. Its object is to provide an immediate means of ascertaining a course from point to point on any map irrespective of whether such map is provided with divided borders or close latitude and longitude divisions provided that the true or magnetic north is indicated.

The invention is carried out as follows reference being made to the accompanying drawings in which:—

Figure 1. is a plan of the device. Fig. 2. is a section of a modification of same showing details of construction. Fig. 3. shows a section of the device when mounted over a roller map, suitable for attachment to an aeroplane fuselage. Fig. 4. shows detail of "N" or zero stop on disk. Fig. 5. shows detail of locking device between the compass ring and disk.

In the drawings 1 is the transparent disk made from any suitable material such as celluloid, casein, glass or the like. Said disk is mounted so as to be freely rotatable and preferably in a concentric circumferential bearing $1^a$ so as to give a clear view of the map 2, disposed beneath the disk. The bearing $1^a$ consists of a metal ring screwed to the underside of the compass ring, the rabbet being deep enough to allow the material of the disk to expand or contract. The disk 1 is ruled with a plurality of fine equi-spaced parallel lines 3, one of which $3^a$ passes through the center of the disk said line being provided with a pointer as shown at $3^b$. This line may be of a different color to the others or it may have the usual "N" indication. A knob $1^b$ is provided for rotating said disk.

Concentrically mounted with respect to the disk 1 is an annular compass ring 4 divided into degrees and the usual compass points. This ring is journaled peripherally in a seating $4^a$, a brass or like ring $4^b$ retaining same in position so as to be capable of rotation, and above this ring, and circumferentially mounted therewith in a state of fixity is a magnetic variation device 5 preferably divided with divisions that are radial extensions of the compass ring divisions.

The compass ring 4 is at one point provided with a handle 6, by means of which the compass ring may be rotated. A locking device is provided between the compass ring and the disk, and one method of carrying this out is shown in Fig. 5, in which the disk bearing ring $1^a$ is slotted and a pivoted clip 7 provided that is tensioned by a screw 8 and normally held in an inoperative position by spring 9. By these means the disk 1 may be locked to the compass ring 4 and the two rotated together. A similar locking device is provided for the compass ring for the purpose of locking this ring only. This consists of a spring 10 pivoted at $10^a$ having a handle $10^b$ and moving radially over the metal plate $10^c$ said plate having a stop $10^d$. The lock in this case is frictional and is sufficient for the purpose. The whole of these devices are mounted and journaled in a suitable seating or frame $4^a$, capable of being disposed above the map 2, or if the map is of the strip and roller variety, (which are much used for aviation purposes) they may be mounted upon the lid of a box 12 containing the map rollers as shown in Fig. 3, the box having external handles 13 for moving the map as shown in Fig. 1.

One method of operating this invention is as follows:—The central disk and compass ring are locked together by means of the screw 8 with their "N" indications coinciding with each other and with the zero of the variation indicator disposed over the chart, they are then rotated until the ruled lines on the disk are parallel to the north line indication on the chart. The compass ring is now locked and the disk is released and rotated by it-self until the ruled lines are parallel to the course desired from point to point, when the number of degrees to be steered east or west of "N" will be found indicated on the compass ring coincident with the disk pointer. The disk and ring may now be locked together by means of the screw 8. To facilitate reading the compass ring may be provided with two scales reading right and left from the north point.

To allow for magnetic variation, the compass ring and disk, when locked together are moved east or west according to the variation invariably marked on every navigation chart, the ring being set by the divisions on the variation indicator 5. The device now gives the course to be steered by compass with extreme accuracy leaving only currents or windage to be allowed for.

For marine or dirigible purposes the whole compass ring and disk may be mounted upon a board and so arranged that it can be moved over a stationary map and the course read off as described, this type is shown in section in Fig. 2. For such purposes the disk 1 may be slotted as shown at 14, the sides of the slots being used for marking the desired course upon the chart prior to the use of the device for its functional purposes.

In order that the "N" point between the compass ring 4 and the disk 1, may be readily found, the fit between the bearing of the disk and the disk itself may be such that sufficient play is given to the disk that it is capable of depression against a spring 15 and be engaged or disengaged from the projection 16, on the underside of the ring 4. The disk having a hole or depression 17 that engages said projection.

I claim.

1. In a navigation device, the combination, with a supporting frame provided with an opening, of a graduated compass ring and a marked translucent disk mounted in the said opening and revoluble therein independently of each other, means for locking the compass ring and disk together, and means for locking the compass ring to the frame.

2. In a navigation device, the combination, with a supporting frame provided with an opening, of a graduated compass ring and a marked translucent disk mounted in the said opening and revoluble therein independently of each other, a magnetic variation scale arranged adjacent to and concentric with the compass ring, means for locking the compass ring and disk together, and means for locking the compass ring to the frame.

3. In a navigation device, the combination, with a supporting frame provided with an opening, of a graduated compass ring and a marked translucent disk mounted in the said opening and revoluble therein independently of each other, a spring-released locking-clip pivotally supported from the compass ring, a screw engaging with a screw-threaded hole in the compass ring and operating to press the locking-clip against the said disk, and means for locking the compass disk to the frame.

In testimony whereof I have affixed my signature, in presence of two witnesses.

HENRY SAMUEL GIST.

Witnesses:
O. J. WORTH,
L. E. BOWIE.

---

Copies of this patent may be obtained for five cents each, by addressing the "Commissioner of Patents, Washington, D. C."